W. B. UFFERT.
MOTOR ATTACHMENT.
APPLICATION FILED JAN. 28, 1919.

1,362,452.

Patented Dec. 14, 1920.
2 SHEETS—SHEET 1.

Inventor
W. B. Uffert

By _____ Attorney

W. B. UFFERT.
MOTOR ATTACHMENT.
APPLICATION FILED JAN. 28, 1919.

1,362,452.

Patented Dec. 14, 1920.

2 SHEETS—SHEET 2.

Inventor
W. B. Uffert.

Attorney

UNITED STATES PATENT OFFICE.

WALTER B. UFFERT, OF ROCHESTER, NEW YORK.

MOTOR ATTACHMENT.

1,362,452.  Specification of Letters Patent. Patented Dec. 14, 1920.

Application filed January 28, 1919. Serial No. 273,611.

*To all whom it may concern:*

Be it known that I, WALTER B. UFFERT, a citizen of the United States, residing at Rochester, in the county of Monroe and State of New York, have invented certain new and useful Improvements in Motor Attachments; and I do hereby declare the following to be a full, clear, and exact description of the invention, such as will enable others skilled in the art to which it appertains to make and use the same.

This invention relates to improvements in electric motor attachments and has for one of its objects the provision of means for automatically stopping the motor when the bearings to the armature shaft become worn or destroyed thus obviating further damage to the motor.

Another object of this invention is the provision of means adapted to break the circuit between the field coils when the armature shaft is left down by worn or destroyed bearings.

A further object of this invention is the provision of a motor attachment of the above stated character which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1:
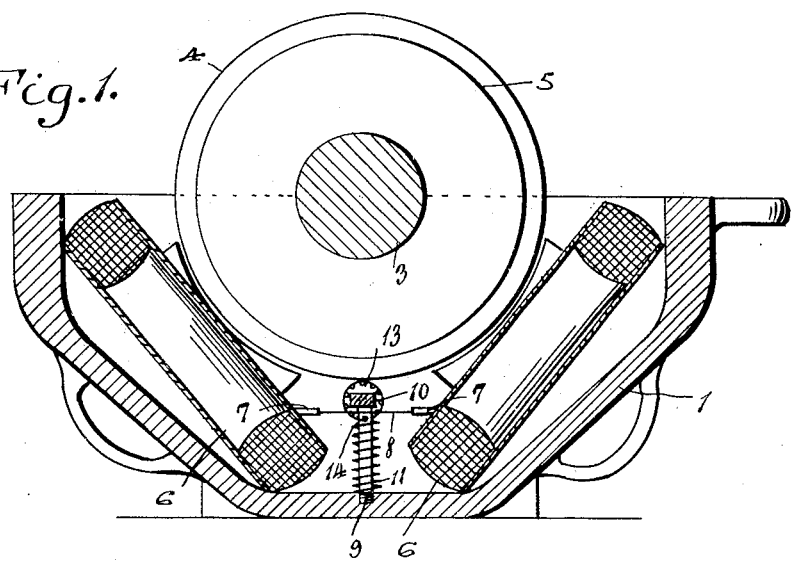
Figure 2:
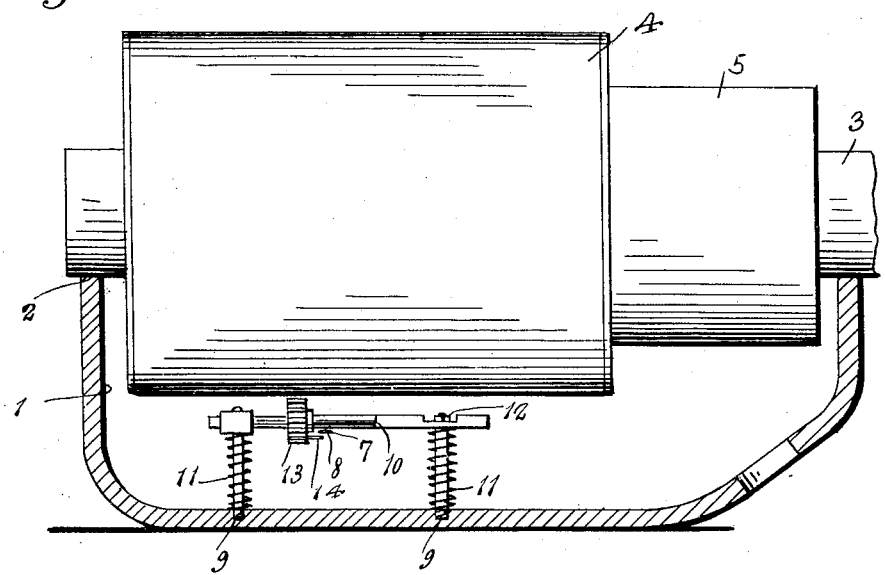
Figure 3:
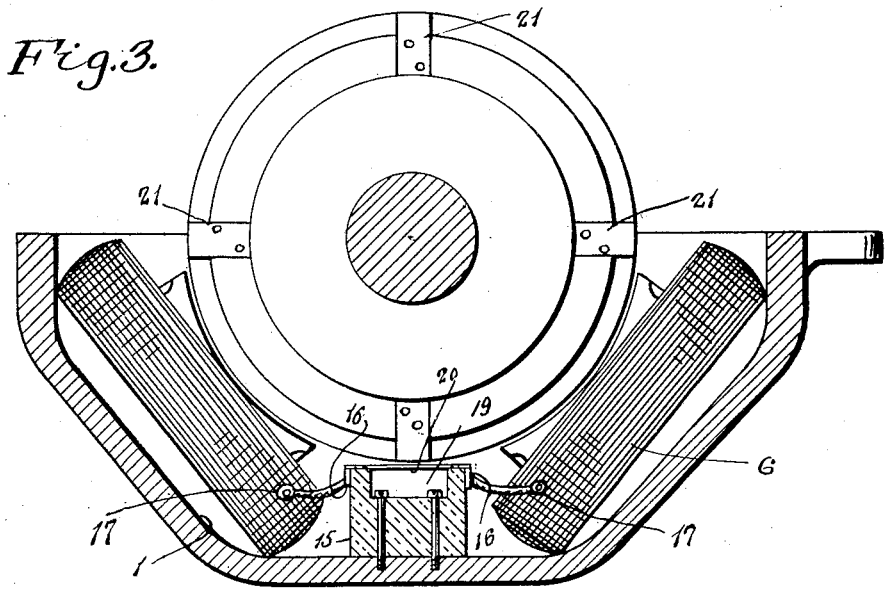
Figure 4:
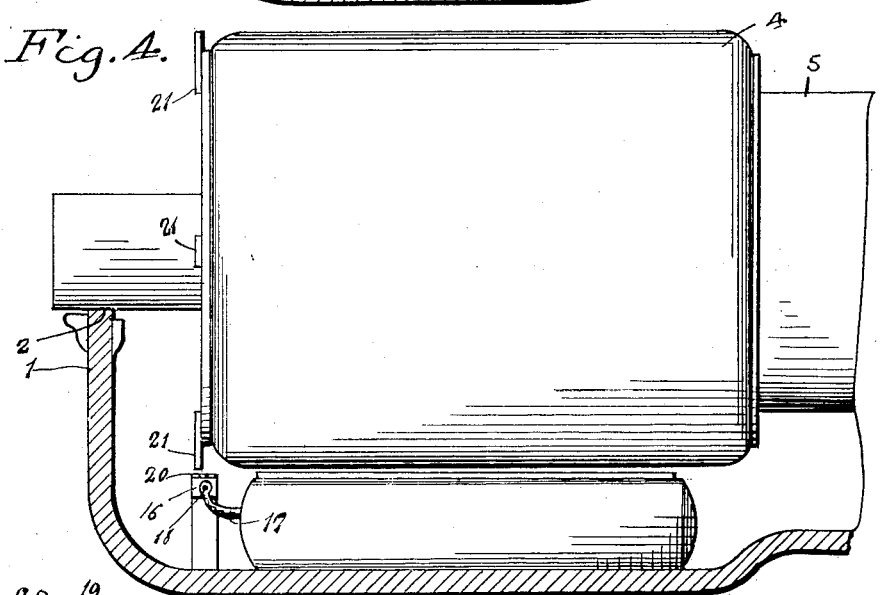
Figure 5:
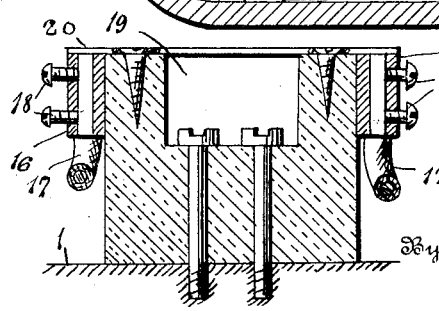

Figure 1 is a vertical sectional view of a motor attachment constructed in accordance with my invention, Fig. 2 is a transverse sectional view of the same, Fig. 3 is a vertical sectional view of a modified form of my invention, Fig. 4 is a transverse sectional view of the same, and Fig. 5 is an enlarged sectional view of my modified form of invention.

Referring in detail to the drawings, the numeral 1 indicates one section of a motor casing provided with the usual bearings 2 to rotatably receive the armature shaft 3. The armature shaft 3 is provided with the usual armature 4 and commutator 5. Located within the casing 1 about the armature coil 4 are spaced field coils 6 provided with terminals 7 connected by a fuse or breakable wire 8 so that the electrical current can pass from one field to the other.

Relatively spaced bolts 9 are secured to the bottom wall of the casing 1 and have slidably mounted thereon a shaft 10. Coil springs 11 are mounted upon the bolts 9 between the casing and shaft for urging the same in engagement with the nuts 12 threaded to the upper ends of the bolts so that the location of the shaft in relation to the armature coil can be varied as desired. A wheel 13 is journaled upon the shaft 10 and is provided with a serrated face and has secured to one side face a pin 14 adapted to strike the fuse or breakable wire 8 when said wheel is rotated.

In operation, when the bearings 2 become worn or destroyed and permit the armature shaft 3 to move downwardly within the casing, the armature engages the wheel 13 rotating the same causing the pin 14 to strike the fuse and break the same, causing the electric circuit between the field coils to be broken thus rendering the motor inoperative.

From the foregoing description, taken in connection with the accompanying drawings, it will be noted that means have been provided that will automatically break the circuit between the field coils of a motor when the bearings for the armature shaft become worn or destroyed, thus making the device especially adaptable for electric motors used in connection with cars so that the motor will be automatically stopped in case of injury to the bearings wherein ordinary types of motors are permitted to run when the bearings become loose which in time destroys other parts of the motor.

Referring to my modified form of invention, it consists of an insulated block 15 bolted or otherwise secured to the bottom of the casing 1 between the field coils 6 and has formed upon each side thereof terminals 16 adapted to receive the ends of conductors 17 which are connected to the field coils 6. The conductors 17 are secured within the terminal 16 by screws 18. The upper face of the block 15 has formed therein a pocket 19 over which extends a fuse or easy breakable wire 20 having its ends secured to the terminals 16 in any well known manner.

Secured to the armature of the motor are relatively spaced plates or knives 21 which are adapted when the bearings become worn to sever or break the fuse or wire 20 breaking the circuit between the field coils thus automatically stopping the motor.

While I have shown and described the preferred embodiment of my invention, it will be understood that minor changes in construction, combination, and arrangement of parts may be made without departing from the spirit and scope of the invention as claimed.

Having thus described my invention, what I claim is:—

1. A motor including a casing having bearings rotatably supporting an armature, spaced field coils located in said casing, means connecting said field coils, and means adapted to sever said means when the armature is lowered within the casing by wearing of the bearings.

2. A motor including a casing having bearings rotatably supporting an armature, spaced field coils located in the casing, a fuse wire connecting said field coils, and means adapted to sever said fuse wire when the armature is lowered within the casing by wearing of the bearings.

3. A motor including a casing having bearings rotatably supporting an armature, spaced field coils located in said casing, a fuse wire connecting said field coils, a shaft movably mounted within said casing, a wheel carried by said shaft and adapted to be rotated by the armature when lowered within the casing by wearing of the bearings, and a pin carried by said wheel adapted to break the fuse wire when said wheel is rotated.

4. The combination with an electric motor having field coils, of a fuse connecting the field coils, means adapted to be operated by displacement of the armature and adapted when operated to sever the fuse in the field coils.

In testimony whereof I affix my signature in presence of two witnesses.

WALTER B. UFFERT.

Witnesses:
ALFRED M. DAY,
HENRIETTA E. RATH.